(12) United States Patent
Michaud

(10) Patent No.: US 9,766,990 B1
(45) Date of Patent: Sep. 19, 2017

(54) CHECKPOINT BLOCK STORAGE DEVICE

(71) Applicant: EMC CORPORATION, Hopkinton, MA (US)

(72) Inventor: Adrian Michaud, Carlisle, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 430 days.

(21) Appl. No.: 14/493,573

(22) Filed: Sep. 23, 2014

(51) Int. Cl.
*G06F 11/14* (2006.01)
*G06F 17/30* (2006.01)
*G06F 12/02* (2006.01)
*G06F 3/06* (2006.01)
*G06F 11/10* (2006.01)

(52) U.S. Cl.
CPC ......... *G06F 11/1471* (2013.01); *G06F 3/065* (2013.01); *G06F 3/067* (2013.01); *G06F 3/0619* (2013.01); *G06F 11/108* (2013.01); *G06F 11/1435* (2013.01); *G06F 12/0246* (2013.01); *G06F 17/30324* (2013.01); *G06F 2201/84* (2013.01); *G06F 2212/7209* (2013.01)

(58) Field of Classification Search
CPC .................... G06F 11/1471; G06F 2201/84
See application file for complete search history.

(56) References Cited

U.S. PATENT DOCUMENTS

| | | | | |
|---|---|---|---|---|
| 6,052,797 A * | 4/2000 | Ofek | .................. | G06F 11/2064 709/219 |
| 6,189,079 B1 * | 2/2001 | Micka | ................. | G06F 11/2071 711/161 |
| 6,792,518 B2 * | 9/2004 | Armangau | .......... | G06F 11/1469 707/999.202 |
| 7,340,640 B1 * | 3/2008 | Karr | ...................... | G06F 3/0613 711/209 |
| 2003/0065901 A1 * | 4/2003 | Krishnamurthy | ..... | G06F 3/0601 711/170 |
| 2004/0168034 A1 * | 8/2004 | Homma | .............. | G06F 11/1466 711/162 |
| 2007/0073986 A1 * | 3/2007 | Ninose | ................ | G06F 11/2058 711/162 |
| 2009/0271412 A1 * | 10/2009 | Lacapra | ............ | G06F 17/30206 |
| 2010/0011238 A1 * | 1/2010 | Nakamura | .......... | G06F 11/1458 714/5.1 |
| 2013/0031308 A1 * | 1/2013 | De Spiegeleer | ...... | G06F 3/0604 711/122 |

* cited by examiner

*Primary Examiner* — Steve Nguyen
(74) *Attorney, Agent, or Firm* — Daly, Crowley Mofford & Durkee, LLP

(57) ABSTRACT

A checkpoint device is a transaction-based block device wherein data is committed to non-volatile memory (NVM) or tiered storage upon completion of a checkpoint. Automatic and instant rollback to the previous checkpoint is provided upon restart if any failure occurred during the previous checkpoint. Related techniques are also described.

18 Claims, 8 Drawing Sheets

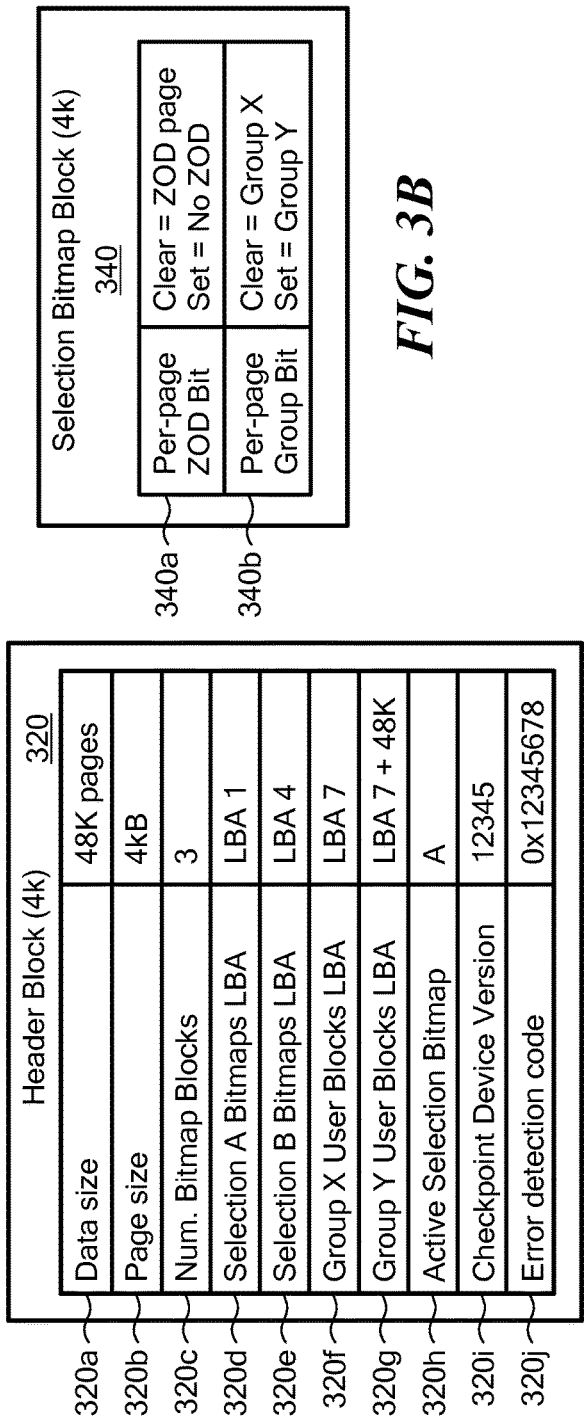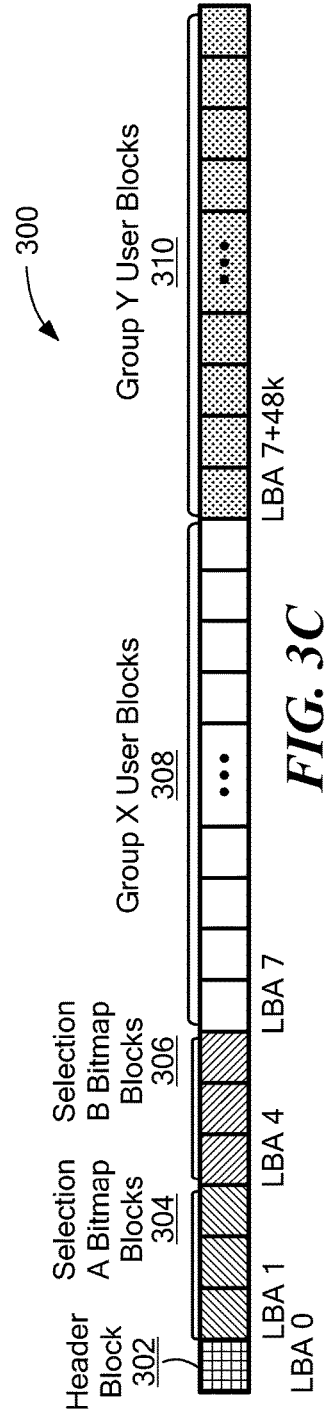
FIG. 3A
FIG. 3B
FIG. 3C

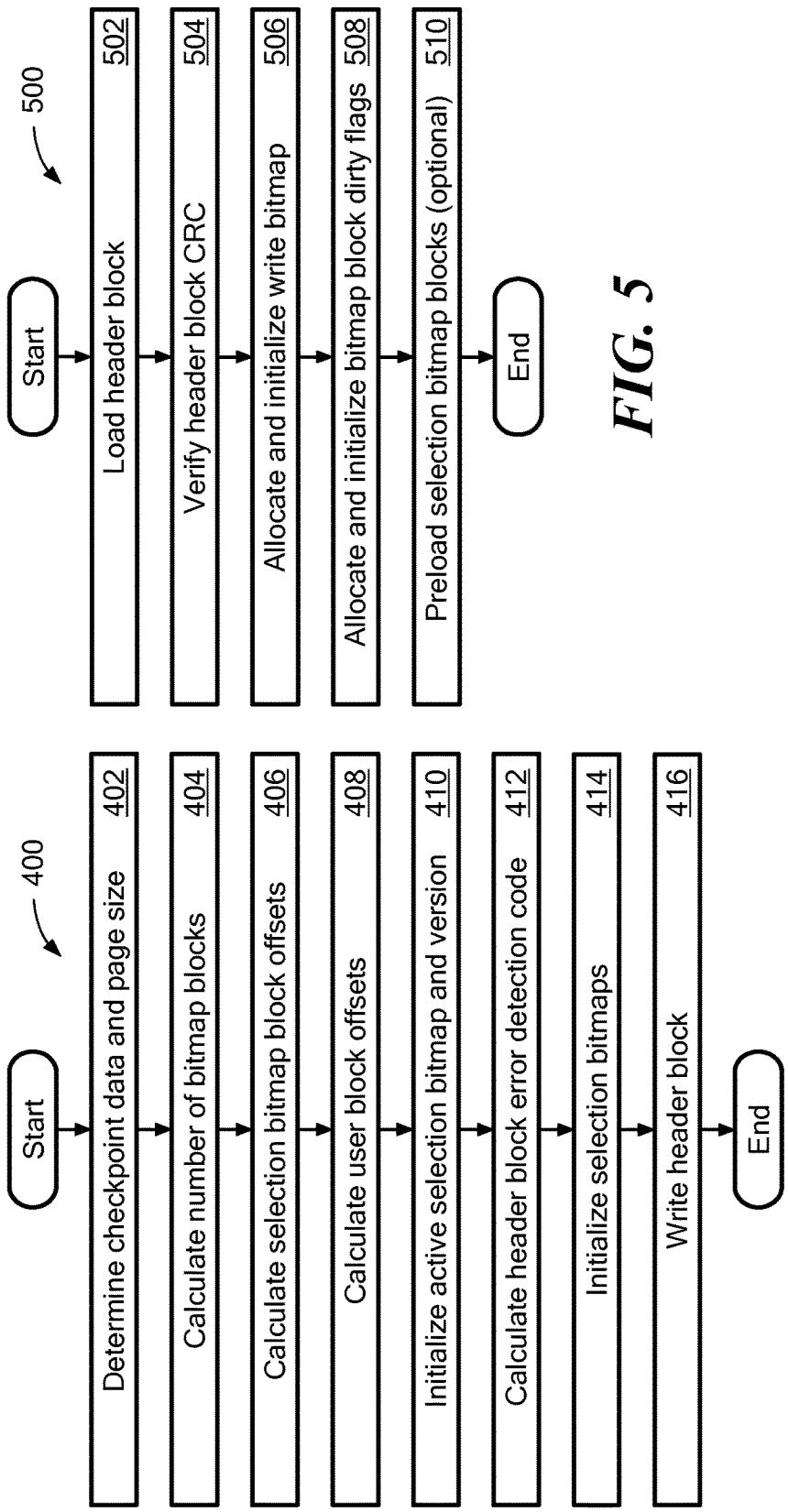

CHECKPOINT BLOCK STORAGE DEVICE

BACKGROUND

As is known in the art, computer systems which process and store large amounts of data typically include one or more applications (e.g., server applications) in communication with a shared data storage system. The data storage system may include one or more storage devices, usually of a fairly robust nature and useful for storage spanning various temporal requirements, e.g., hard disk drives (HDDs). For example, a storage system may include an array ("storage array") having a plurality of storage devices with on-board intelligent and communications electronics and software. Within a storage system, storage devices (or partitions therein) are commonly identified using logical unit numbers (LUNs). Applications perform their respective operations using the storage system.

In a data storage environment comprised of combined memory and storage tiering, the ability to define multiple, independent memory tiers is desired. A memory tier is typically constructed by memory mapping a region of a storage class memory (SCM) device or a region of an array storage device into a process' virtual memory address space. Examples of SCM include NAND flash and next generation non-volatile memory (NVM) devices. Memory-mapped regions may be fronted by a DRAM page cache to which an application issues loads and stores. The memory tiering mechanism moves data between the SCM or array device and the DRAM page cache on-demand.

SUMMARY

It is appreciated herein that it would be desirable to provide a transaction-based block device wherein data is committed to a storage device (e.g., non-volatile memory (NVM), tiered storage, etc.) upon completion of a checkpoint. The block device should remain in a consistent state regardless of any errors that occur between checkpoints, or during a checkpoint operation. It would be advantageous for the block device to automatically and instantaneously rollback to the previous checkpoint upon restart.

Described herein is a method comprising: receiving a request to write a user page to a storage device; loading a bitmap block from the storage device into memory, the bitmap block indicating whether the user page was written to a first storage region or a second storage region at a last checkpoint, the first and second storage regions located within the storage device; selecting, based at least in part upon information within the bitmap block, the first or second storage region to write the user page to; updating a bitmap block in memory to indicate the selected storage region; writing the user page to the selected storage region; and in response to receiving a checkpoint request, writing the bitmap block to the storage device.

In some embodiments, the method further comprises: loading a header block from the storage device into memory, the header block indicating whether the bitmap block was written to a first bitmap block region or a second bitmap block region at the last checkpoint, the first and second bitmap block regions located within the storage device; and in response to receiving the checkpoint request, atomically writing the header block to the storage device. In such embodiments, writing the bitmap block to the storage device comprises: selecting, based at least in part upon information within the header block, the first or second bitmap block region to write the bitmap block to; updating the header block in memory to indicate the selected bitmap block region; and writing the bitmap block to the selected bitmap block region. Loading the header block from the storage device may include loading the header block from a predetermined logical block address (LBA), and loading the bitmap block from the storage device may include loading the bitmap block from an LBA determined using information within the header block. The method may also include writing the user page to an LBA calculated using an offset within the header block, the offset associated with the selected storage region.

In certain embodiments, the method further comprises calculating an error detection code based upon information within the header block and updating the header block in memory to include the calculated error detection code. The error detection code may be a 32-bit cyclic redundancy code (CRC).

In some embodiments, the method further comprises: updating a page write bitmap in memory to indicate the user page was written since the last checkpoint, wherein selecting the first or second storage region is further based upon the page write bitmap; and in response to receiving the checkpoint request, clearing the page write bitmap. The bitmap block may be one of a plurality of bitmap blocks and the method may further comprise: setting one of a plurality of bitmap block dirty flags in memory to indicate the user page was written since the last checkpoint; in response to receiving the checkpoint request, using the plurality of bitmap block dirty flags to determine which of a plurality of bitmap blocks to write to the storage device; and in response to receiving the checkpoint request, clearing the plurality of bitmap block dirty flags.

In certain embodiments, the method further comprises: receiving a request to read the user page from the storage device; determining, based at least in part upon information within the bitmap block, whether the user page was written to the first or second storage region at the last checkpoint; and reading the user page from the determined storage region. The bitmap block may indicate whether the user block has previously been written to, wherein the user page is not read from the determined storage region if the user page has not previously been written to.

Also described herein is a data storage system comprising a storage device, a memory device, and a checkpoint device means coupled to the storage device and the memory device. The checkpoint device means is for: receiving a request to write a user page to the storage device; loading a bitmap block from the storage device into the memory, the bitmap block indicating whether the user page was written to a first storage region or a second storage region at a last checkpoint, the first and second storage regions located within the storage device; selecting, based at least in part upon information within the bitmap block, the first or second storage region to write the user page to; updating a bitmap block in memory to indicate the selected storage region; writing the user page to the selected storage region; and in response to receiving a checkpoint request, writing the bitmap block to the storage device.

The checkpoint device means can be associated with a device driver of an operating system (OS). In certain embodiments, the storage device includes a Flash device. In some embodiments, the checkpoint device means is operatively coupled to the storage device via a storage area network (SAN).

In various embodiments of the data storage system, the checkpoint device means is further for: loading a header block from the storage device into memory, the header block indicating whether the bitmap block was written to a first bitmap block region or a second bitmap block region at the last checkpoint, the first and second bitmap block regions located within the storage device; and in response to receiving the checkpoint request, atomically writing the header block to the storage device, wherein writing the bitmap block to the storage device comprises: selecting, based at least in part upon information within the header block, the first or second bitmap block region to write the bitmap block to; updating the header block in memory to indicate the selected bitmap block region; and writing the bitmap block to the selected bitmap block region. The header block may be stored within the storage device at a pre-determined logical block address (LBA), the bitmap block may be stored within a region of the storage device beginning at an LBA offset specified within the header block, and the selected storage region may begin at an LBA offset specified within the header block.

Further described herein is a computer program product tangibly embodied in a non-transitory computer-readable medium, the computer-readable medium storing program instructions that are executable to perform various embodiments of the method described hereinabove.

BRIEF DESCRIPTION OF THE DRAWINGS

The concepts, structures, and techniques sought to be protected herein may be more fully understood from the following detailed description of the drawings, in which:

FIG. 3A shows an illustrative header block for use within the checkpoint device of FIG. 2;

FIG. 3B shows an illustrative selection bitmap block for use within the checkpoint device of FIG. 2;

FIG. 3C shows an illustrative block layout for use within the checkpoint device of FIG. 2;

FIG. 4 is a flowchart illustrating a method for initializing a checkpoint device;

FIG. 5 is a flowchart illustrating a method for opening a checkpoint device;

Figure 1:
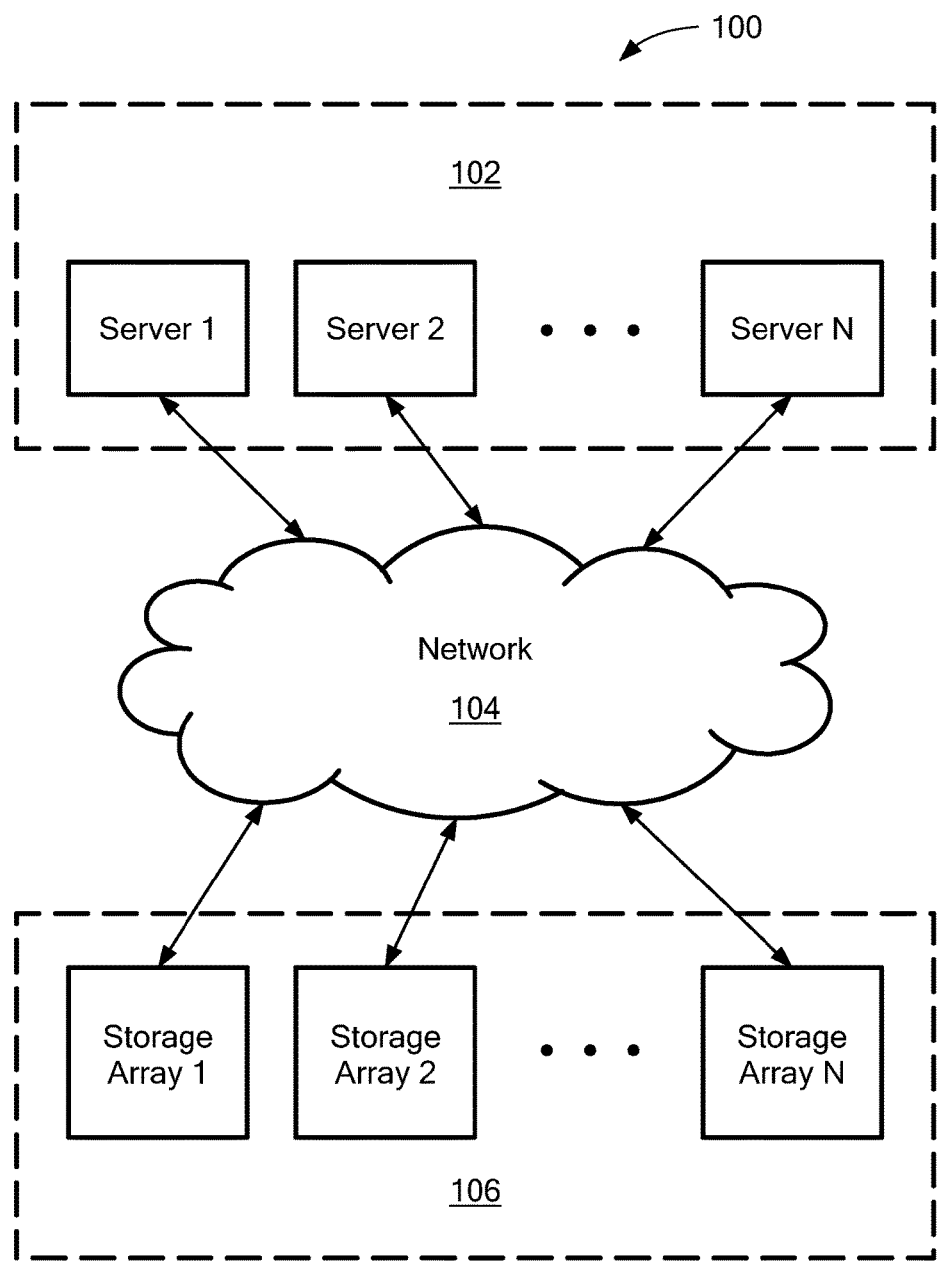
FIG. 1 is a network diagram of an illustrative data storage environment.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the systems and methods sought to be protected herein, some terms are explained. As used herein, the term "kilobyte" (and corresponding abbreviation "kB") refers to a multiple of the unit byte for digital information, typically 1,024 bytes, although it may also refer to 1,000 bytes. The abbreviation "K" refers to a multiple of 1,024 or 1,000. As used herein, the term "block" refers to the smallest unit of allocation inside a storage device, typically a few kilobytes in size (e.g., 4 kB). The term "page" refers to a unit of allocation within a storage device. The size of a page may be defined on a per-application basis and is generally a multiple of the block size. The term "region" is used herein to refer to a contiguous arrangement of blocks or pages.

The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

The term "memory" herein refers to any type of computer memory accessed by an application using memory access programming semantics, including, by way of example, dynamic random access memory (DRAM) and memory-mapped files. Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

As used herein, the term "checkpoint" generally refers to any identifier or other reference that identifies the state of a storage device at a point in time. In the event of an unexpected system failure, the storage device can be reverted (or "rolled back") to the state corresponding to a most recent checkpoint. The term "checkpoint" also refers to the process of establishing a new checkpoint.

FIG. 1 shows an illustrative data storage environment 100 comprising one or more servers 102 operatively coupled to one or more storage arrays 106 via a network 104. The network 104 may be any known communication network or combination of networks including networks using protocols such as, but not limited to, Ethernet, Internet Small Computer System Interface (iSCSI), Fibre Channel (FC), wireless protocols, etc.

The servers 102 are hosts configured to execute applications, such as database applications, and may comprise off-the shelf server hardware and/or software (e.g., a Windows server, a Sun Solaris server, an HP server, a Linux server, etc.) A storage array 106, which may be a storage area network (SAN) array, comprises one or more physical and/or logical storage devices and may utilize storage products such as, by way of example, VNX and Symmetrix VMAX, both commercially available from EMC Corporation of Hopkinton, Mass. A variety of other storage products may be utilized to implement at least a portion of a storage array. In embodiments, the storage arrays 106 utilize fully automated storage tiering (FAST) technology from EMC Corporation. As is known, FAST technology helps place the application data in the right storage tier based on the frequency with which data is being accessed. It is understood that any suitable storage tiering techniques can be used.

In general operation, a server 102 executes an application which issues data read and write requests ("commands") to a storage array 106. The storage array 106 is configured with storage resources (e.g., disk drives) used to store backend data files. The storage array 106 processes read and write commands received from the application host and, in the case of a read request, sends data stored thereon back to the requesting server 102.

Figure 2:
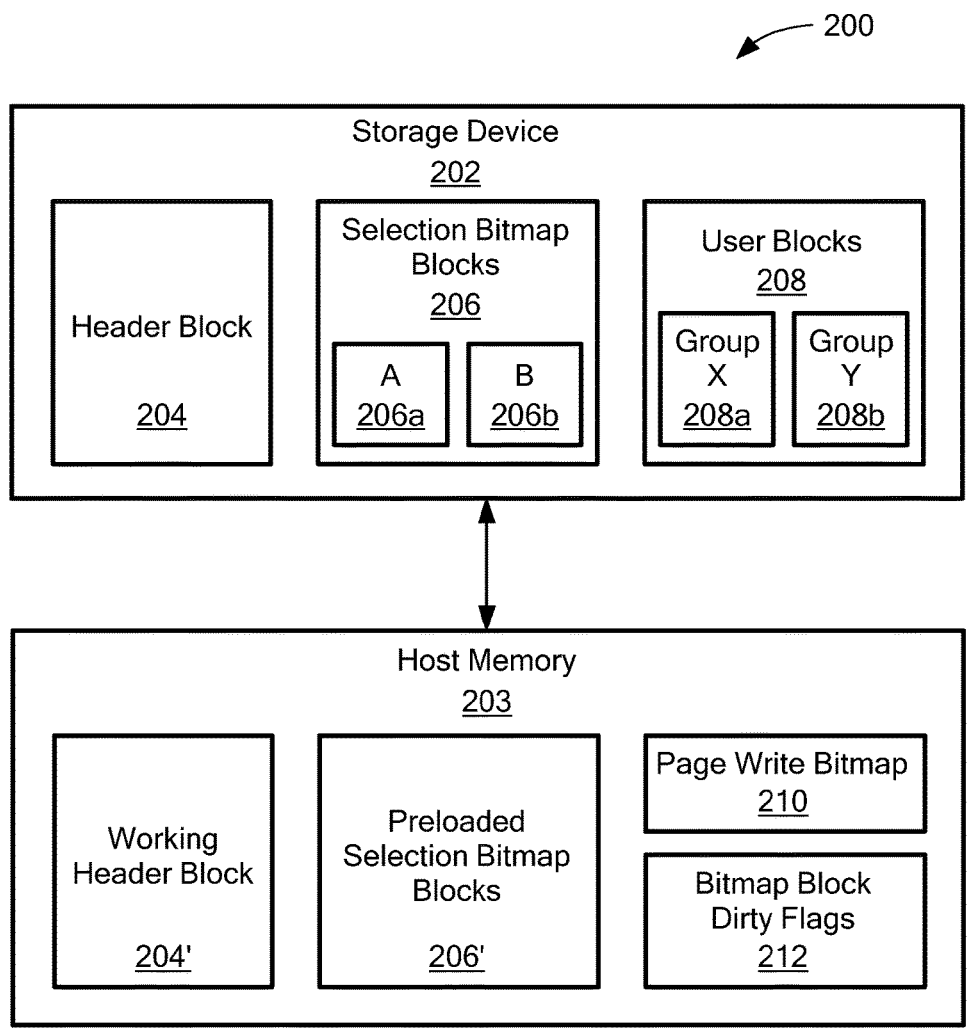
FIG. 2 is a block diagram illustrating a checkpoint device.

Referring to FIG. 2, an illustrative checkpoint device 200 includes a storage device portion 202 and a host memory portion 203. The storage device portion 202 corresponds to blocks/regions within a storage device. The host memory portion 203 corresponds to regions within a memory system, for example regions of a virtual address memory space associated with an application executing upon an application server 102 (FIG. 1). In some embodiments, the checkpoint device 200 is implemented as a driver, such as a Linux block device driver. The checkpoint device driver may utilize another block device driver (e.g., a standard available driver) to read/write blocks of data to/from the storage device.

The storage device portion 202 includes a header block 204, selection bitmap blocks 206, and user blocks 208. The selection bitmap blocks 206 are segmented into Selection A bitmap blocks 206a and Selection B bitmap blocks 206b, both segments generally having an equal number of bitmap blocks, the bitmap blocks generally having equal size. The user blocks 208 are segmented in Group X user blocks 208a and Group Y user blocks 208b, both segments generally having an equal number of user blocks, each user block generally having equal size. The user blocks store application data (or "user data"), whereas the header block 204 and selection bitmap blocks 206 store metadata used by the checkpoint device. The various blocks/regions 204-208 can be arranged linearly upon the storage device and accessed using linear block addresses (LBAs). In some embodiments, the various block/regions 204-208 are arranged contiguously, as shown in FIG. 3C.

The host memory portion 203 can include a working header block 204', a page write bitmap 210, and bitmap block dirty flags 212. The working header block 204' is a copy of the stored header block 204 which may include certain changes not yet committed to the storage device. To improve the performance of read operations, the checkpoint device 200 may, in certain embodiments, preload selection bitmap blocks 206 into host memory as preloaded selection bitmap blocks 206'. The page write bitmap 210 is used to identify which user pages that have been written since the last checkpoint, and the bitmap block dirty flags 212 are used to identify which bitmap blocks that have been modified (in memory) since the last checkpoint.

An application reads and/or writes pages to a storage device using the checkpoint device 200 (i.e., using interfaces provided by the checkpoint device 200). The total number of user pages that can be stored within the checkpoint device is referred to as the user data size. Both Group X 208a and Group Y 208b are sized so as to be able to store all user pages. For a given user page, the selection bitmap blocks 206 indicate whether the page is to Group X 208a or Group Y 208b (i.e., whether the page was written to the Group X region or the Group Y region at the last checkpoint). The header block 204 includes information (e.g., LBA offsets) about the location of the bitmap blocks 206 and the user blocks 208 within the storage device 202. The header block 204 also indicates which of the two regions of selection bitmap blocks, Selection A 206a or Selection B 206b, is active as of the last checkpoint. Using these structures and techniques, the checkpoint device 200 is able to guarantee data consistency between checkpoints and to provide automatic rollback to the last checkpoint in the event of a failure.

Referring to FIG. 3A, an illustrative header block 320, which may be the same as or similar to header block 204 in FIG. 2, includes a plurality of attributes 320a-320j which are initialized, modified, and accessed by the checkpoint device. Not all the attributes 320a-320j are required, and other attributes may be included. The illustrative header block attributes include: a checkpoint data size 320a, indicating the total number of user pages that can be stored within the checkpoint device; a checkpoint page size 320b indicating the size of user pages within the checkpoint device, typically a size evenly divisible by the host native block size; a number of bitmap blocks 320c; a Selection A bitmap blocks starting address 320d indicating the LBA of the first bitmap block within the Selection A region; a Selection B bitmap blocks starting address 320e indicating the LBA of the first bitmap block within the Selection B region; a Group X user blocks starting address 320f indicating the LBA offset for the region of Group X user blocks; a Group Y user blocks starting address 320g indicating the LBA offset for the region of Group Y user blocks; an active selection bitmap identifier 320h indicating which selection bitmap blocks, Selection A or Selection B, is currently active; a checkpoint device version 320i which can be used to manage changes to the checkpoint device over time; and an error detection code 320j used to detect data corruption errors within the header block.

The number of bitmap blocks 320c can be derived using the checkpoint data size 320a and the host native block size. The number of bitmap blocks=(data_size×bits_per_page)÷(native_block_size×8). In the example shown, each page requires two (2) bits with a selection bitmap block (see FIG. 3B), the checkpoint data size 320a is 48K pages, and the host native block size is assumed to be 4 kB; thus, the number of bitmap blocks=(48K×2)÷(4K×8)=3.

In certain embodiments, the header block 204 has a size less than or equal to the maximum atomic write size provided by the underlying storage device (e.g., 512 bytes).

Referring to FIG. 3B, an illustrative selection bitmap block 340, which may be the same as or similar to a selection bitmap block 206 of FIG. 2, includes two bits for every user page: a zero-on-demand (ZOD) bit 340a indicating whether the page has previously been written to, and a group bit 340b indicating whether the page is currently in Group X or Group Y. A selection bitmap block 340 is typically sized to be a multiple of the underlying storage device block size. In this example, a selection bitmap block 340 has a size of 4 kB, requiring one selection bitmap block for every 16K user pages.

As described below in conjunction with FIGS. 6 and 8, the ZOD bit 340a is used to improve the performance of certain operations within the checkpoint device. Thus, in some embodiments, the ZOD bit 340a can be excluded.

Referring to FIG. 3C, an illustrative block layout 300 for use within a checkpoint device includes a header block 302, a Selection A bitmap blocks region 304, a Selection B bitmap blocks region 306, a Group X user blocks region 308, and a Group Y user blocks region 310. The layout 300 may correspond to a physical and/or logical layout upon a storage device (e.g., a LUN). The header block 302 is located at a known LBA (e.g., LBA 0), which is "hardcoded" or otherwise configured within the checkpoint device. In contrast, the locations of the regions 304-310 are specified within the header block.

An application issues read/write operations to the checkpoint device using relative LBAs (referred to herein as "user LBA values" or "user LBAs"). The checkpoint device translates these relative LBAs to actual LBAs used within the storage device. For example, referring to FIG. 3C, if an application issues a read operation to the checkpoint device indicating LBA 0, the checkpoint device will issue a corresponding read operation to the storage device indicating LBA 7 (if the page is in Group X, per 320f) or LBA 48K+7 (if the page is in Group Y, per 320g).

In the example of FIG. 3C, the checkpoint device blocks/regions are arranged contiguously as follows: the header block resides at LBA 0; the Selection A and Select B bitmap block regions both include three blocks beginning at LBAs 1 and 4, respectively; and the Group X and Group Y user block regions both include 48K blocks beginning at LBAs 7 and 48K+7, respectively. Thus, it should be appreciated that the illustrative header block 320 of FIG. 3A and the illustrative layout 300 of FIG. 3C correspond to each other.

FIGS. 4-8 are flowcharts corresponding to below contemplated techniques which could be implemented within a checkpoint device (e.g., the checkpoint device 200 of FIG. 2). Rectangular elements (typified by element 402 in FIG. 4), herein denoted "processing blocks," represent computer software instructions or groups of instructions. Diamond shaped elements (typified by element 604 in FIG. 6), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

In the below descriptions of FIGS. 4-8, reference will be made to various data structures show in FIG. 3 and/or attributes therein. It should be understood that these data structures are merely used as examples and that the techniques shown in FIGS. 4-8 are not limited to these structures.

In a particular embodiment, the methods of FIGS. 4-8 correspond to operations within an application programming interface (API) provided by the checkpoint device. An application could use the API directly, or indirectly via libraries and/or system calls provided by an OS.

Referring to FIG. 4, an illustrative method 400 for initializing a checkpoint device, is shown. The method 400 could be performed by a standalone tool prior to running the application, or by the application on an as-needed basis. For example, the application could invoke method 400 at startup if the checkpoint device has not yet been initialized.

In general, the initialization process 400 involves generating a header block 320 and configuring various attributes therein. At block 402, the checkpoint data size 320a and page size 320b are determined. These settings may be specified by an application via an API and/or may correspond to default values stored within the checkpoint device. In some embodiments, the checkpoint device validates that the specified checkpoint page size 320b is evenly divisible by the host native page size (e.g., 4 kB). At block 404, the number of bitmap blocks 320c is calculated based upon the selection bitmap block size (which is generally the native page size, e.g., 4 kB) and the checkpoint data size 320a, wherein it is known that each user page occupies two bits.

At block 406, the selection bitmap block offsets 320d, 320e are determined. In certain embodiments, the bitmap blocks are arranged contiguously and adjacent to the header block. For example, if the header block is at LBA 0, the checkpoint device may determine the Selection A bitmap block region starts at LBA 1 and the Selection B bitmap block region starts at LBA 1 plus the number of bitmap blocks 320c. Similarly, at block 408, the user block offsets 320f, 320g can be positioned contiguously and adjacent to the selection bitmap blocks. The checkpoint device can use any suitable strategy to automatically determine the block layout. Alternatively, the block layout could be specified by the application.

At block 410, the active selection bitmap 320h is initialized. For example, as shown in FIG. 3A, the active selection bitmap 320h can be initialized to indicate Selection A. In some embodiments, block 410 also includes setting a checkpoint device version 320i to a current version, which may be hardcoded or otherwise configured with the checkpoint device. At block 412, the header block error detection code 320j is calculated. In some embodiments, the error detection code comprises a 32-bit cyclic redundancy code (CRC) calculated over attributes of the header block attributes (e.g. all attributes except the code 320j). Alternatively, the error detection code 320j can also be a hash or any other suitable value for detecting data corruption errors within the header block.

At block 414, the selection bitmap blocks are initialized. This may include zero filling the blocks (e.g., using the "bzero" function available on Linux systems). At block 416, the initialized header block 320 is written to the known header block location (e.g., LBA 0) within the storage device. In some embodiments, the checkpoint device waits for an acknowledgement from the storage device before completing the method 400. At this point, the checkpoint device is fully initialized and can be used by the application to read and write user pages. It will be appreciated that initializing the checkpoint device defines an initial checkpoint; the device will automatically rollback to this initialized state if an error occurs prior to the next checkpoint.

Referring to FIG. 5, an illustrative method 500 for opening a checkpoint device may be invoked by an application at startup. In some embodiments, the checkpoint device validates that method 500 is not invoked prior to initialization method 400 (FIG. 4). At block 502, the header block is loaded from its known location within the storage device (e.g., LBA 0) into memory, where it is referred to as the working header block 204' (FIG. 2). At block 504, the error detection code 320j is used to determine if the header block has been corrupted since it was last written. For example, a 32-bit CRC or hash value may be computed on the loaded header block and compared to the error detection code 320*j*; a fatal error may be reported if the codes do not match.

At block 506, a page write bitmap 210 (FIG. 2) is allocated in host memory and cleared. The page write bitmap includes one bit per user page (i.e., has at least data size 320*a* bits). At block 508, the bitmap block dirty flags 212 (FIG. 2) are allocated in host memory and cleared. The bitmap block dirty flags 212 include one dirty flag per bitmap block. The page write bitmap 210 and/or bitmap block dirty flags 212 may be allocated as an array of bytes (e.g., using the "malloc" Linux system call) having at least $$\left\lceil \frac{\text{num bits}}{8} \right\rceil$$

bytes. Accordingly, the page write bitmap 210 and/or bitmap block dirty flags 212 can be efficiently cleared using a standard system function to zero-out the byte arrays (e.g., using the "bzero" function available on Linux systems).

In some embodiments, at block 510, the selection bitmap blocks 206 (FIG. 2) are preloaded into host memory to reduce latency during subsequent read/write operations. Alternatively, some/all of the selection bitmap blocks 206 may be loaded "on demand" by a subsequent read/write operation; thus, block 510 is optional.

Figure 6:
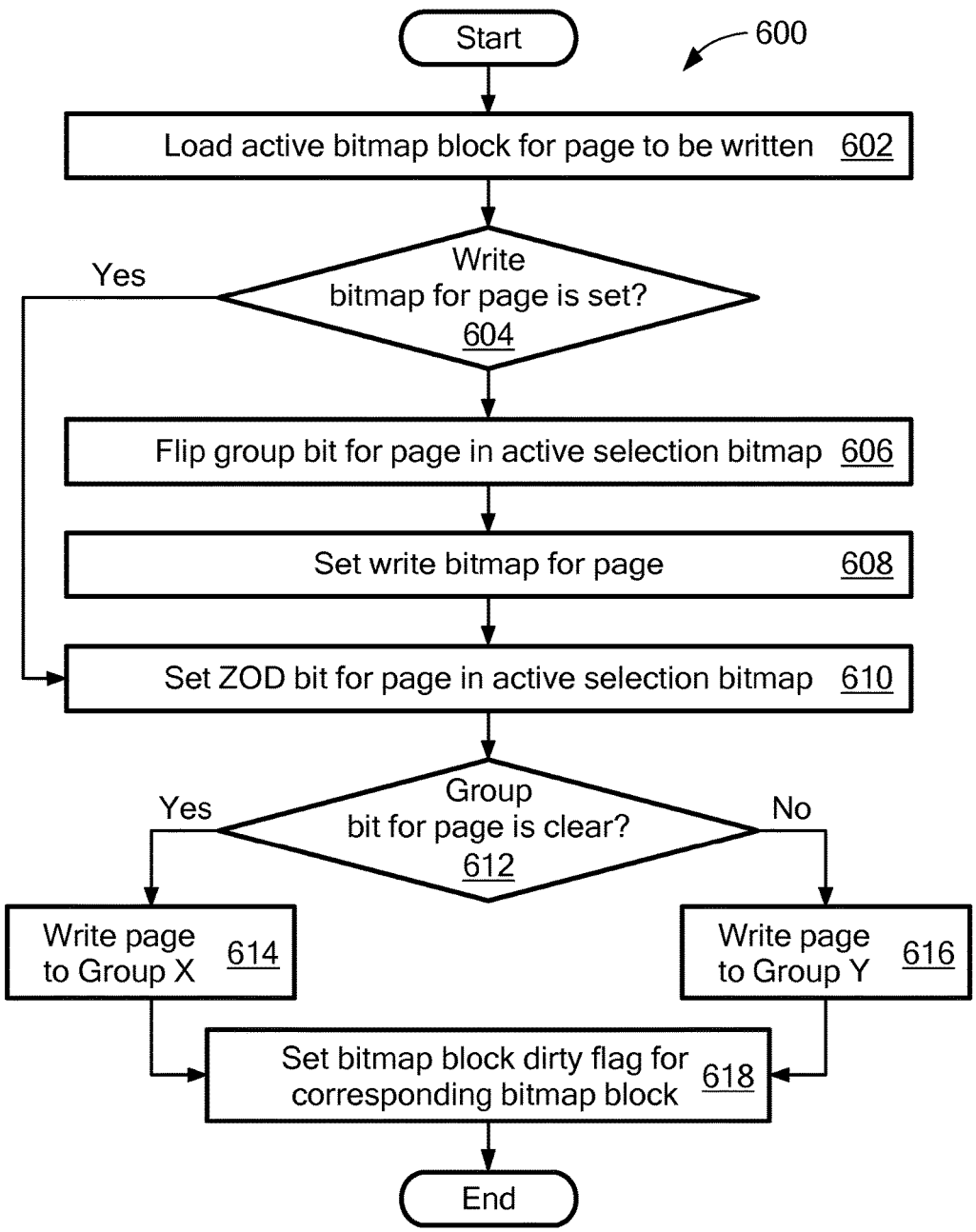
FIG. 6 is a flowchart illustrating a method for writing a page to a checkpoint device.

Referring to FIG. 6, an illustrative method 600 can be invoked by an application to write user pages to the storage device. In some embodiments, the method 600 is invoked by a caching and/or storage tiering system; for example, the method 600 may be invoked when pages are flushed from a DRAM storage tier (or cache) to NAND flash device, a next generation NVM device, a storage array, or any other suitable storage device. Although the method 600 is described herein in terms of writing a single user page, those skilled in the art will understand that the method can be readily extended for writing multiple pages.

As input, the method 600 receives a page number, between 0 and the user data size −1, and data to be written. Using the checkpoint page size attribute 320*b* within the header block, the checkpoint device can calculate the corresponding user LBA for the page (and vice-versa). Thus, an application could specify either a page number or its corresponding user/relative LBA.

At block 602, the active bitmap block for the page is loaded. This block is determined using the page number and the active selection bitmap identifier 320*h*. For example, referring to FIG. 3C, if the page number is 0 and the active selection bitmap is A, the active bitmap would be the block at LBA 1; alternatively, if the page number is 0 and the active selection bitmap is B, the active bitmap block would be the block at LBA 4. If the active bitmap block has not yet been loaded into host memory, it is read from the storage device into host memory for access by the current operation and also by subsequent operations. Otherwise, the active bitmap block can be accessed directly from host memory, reducing latency.

If, at block 604, the write bitmap 210 for the page is not set, and the group bit 340*b* for the page in the active bitmap block is flipped at block 606. This indicates that the page should be written to a different group from the last time it was written. To prevent the page from being relocated more than once between consecutive checkpoints, at block 608, the write bitmap for the page is set. At block 610, the ZOD bit 340*a* is set in the active bitmap block, indicating that a ZOD efficiency technique, described below in conjunction with FIG. 8, can no longer be applied for the page.

At block 612, the page is written to either Group X 308 or Group Y 310, depending on the active bitmap block group bit 240*b*. The checkpoint device calculates the actual LBA to use for writing to the storage device using the page's user LBA and group bit 240*b*. If, at block 614, the page is being written to Group X, the storage device LBA is calculated by adding the Group X user block offset 320*f* to the user LBA. If, at block 616, the page is being written to Group Y, the storage device LBA is calculated by adding the Group Y user block offset 320*g* to the user LBA. The checkpoint device issues a write to the underlying storage using the calculated/translated storage LBA. At block 618, the bitmap block dirty flag 212 for the active bitmap block is set, indicating that active bitmap block, which has been modified in memory, should be written out to the storage device at the next checkpoint.

The checkpoint device need not wait for an acknowledgement that the page has been written to the underlying storage device. If a failure occurs before the next checkpoint, the checkpoint device guarantees that the application's storage state will be consistent with the previous checkpoint (i.e., the write operation of method 600 will be "lost"). As described below in conjunction with FIG. 7, the application must trigger a checkpoint operation to guarantee that write operations to be preserved. Advantageously, the system remains in a consistent state between checkpoints, meaning that if any writes are preserved between consecutive checkpoints, all such writes are preserved.

Figure 7:
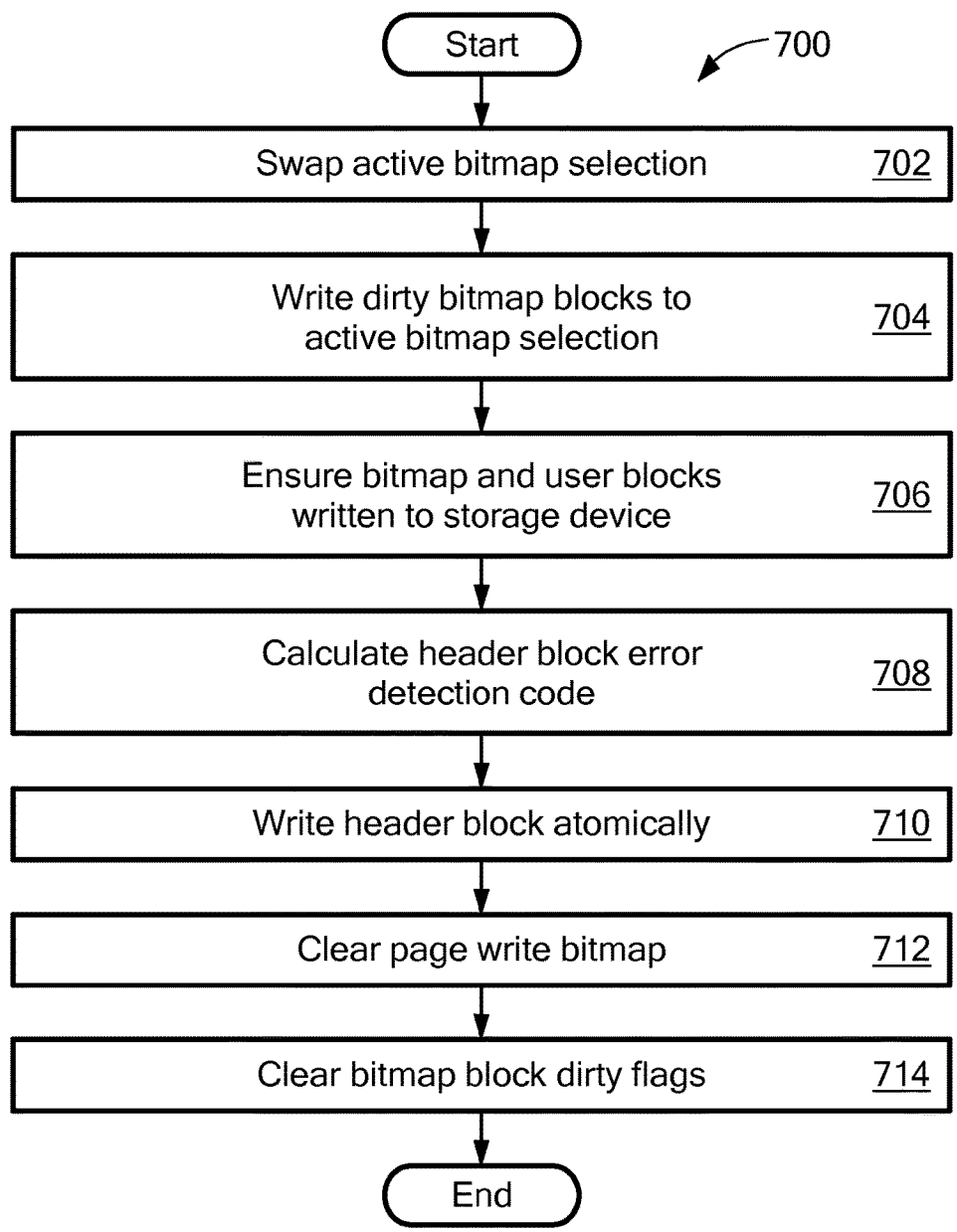
FIG. 7 is a flowchart illustrating a method for performing a checkpoint within a checkpoint device.

Referring to FIG. 7, an illustrative method 700 for performing a checkpoint begins at block 702, where the active bitmap selection 320*h* is swapped (i.e., A to B, or B to A) within the working header block 204' (i.e., the copy of the header block in host memory). At block 704, all dirty bitmap blocks are written to the active bitmap selection, as determined in step 702. This involves uses the bitmap block dirty flags 212 to determine which bitmap blocks should be written, and then writing those blocks to the correct location within either the Selection A region 304 or the Selection B region 306.

At block 706, the checkpoint device ensures that all dirty bitmap and user blocks have been written the storage device. This may involve waiting for acknowledgements from the storage device or invoking a system call to force writes to be flushed (e.g., using the Linux "sync" system call). If the application uses memory tiering, block 706 may also include flushing dirty memory mapped pages to the storage device.

At block 708, the error detection code 320*j* is updated to account for changes made to the working header block 204'. At block 710, the working header block is written to the storage device atomically, meaning that either the entire header block is written or, in the case of a failure, no portion of the stored header block is changed. It will be understood that commercially available storage devices support atomic writes, although they may limit the size of such writes (e.g., 512-byte sector writes). Thus, in some embodiments, the header block has a maximum size to allow for atomic writes.

At this point, the checkpoint is complete and any failure up until the next checkpoint will result in the system being reverted to the current storage state. Also, because the header block is written atomically, the system will remain consistent even if a failure occurs during a checkpoint operation. At blocks 712 and 714, the memory-only page write bitmap 210 and bitmap block dirty flags 212 are cleared, respectively.

Figure 8:
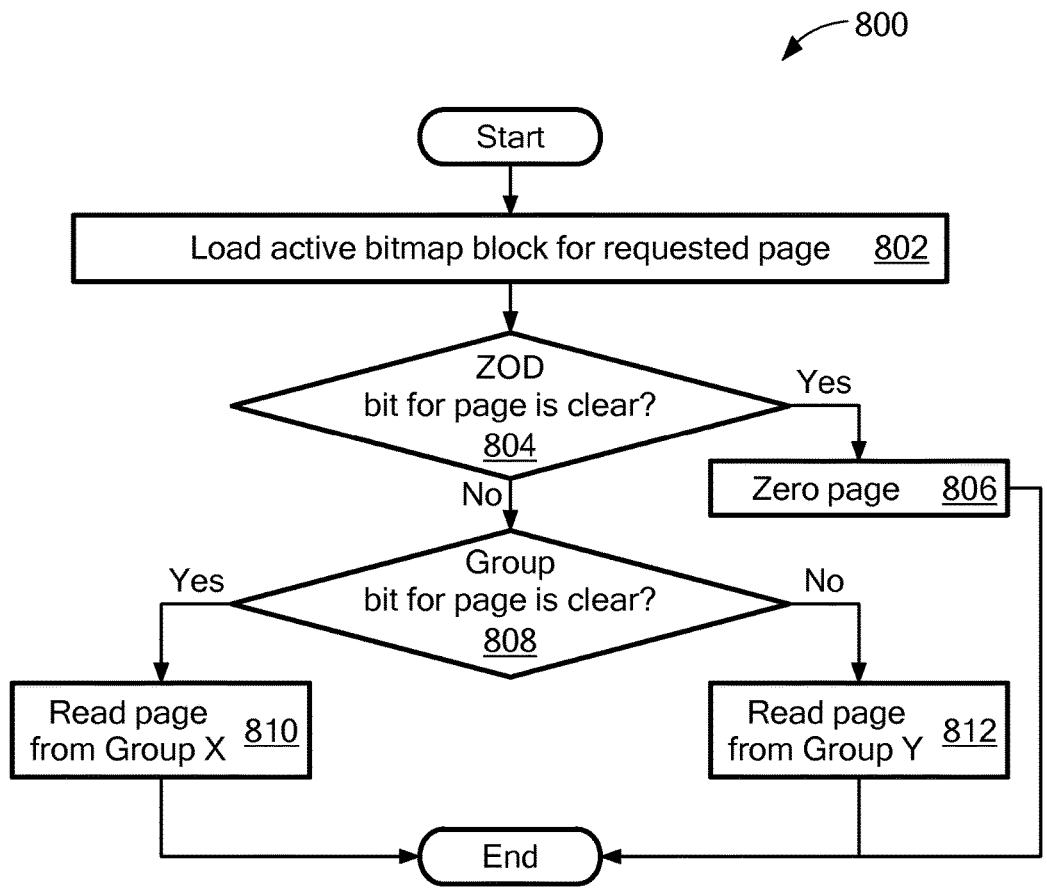
FIG. 8 is a flowchart illustrating a method for reading a page from a checkpoint device.

Referring to FIG. 8, an illustrative method 800 for reading a user page from a checkpoint device begins at block 802, where the active bitmap block for the page is loaded using the technique described above with block 602 of FIG. 6. If, at block 804, the page's ZOD bit 340a is clear, a page is zeroed-out (block 806) using the "bzero" function or any other suitable technique. Thus, in some cases, a checkpoint device read operation can be processed without issuing a read to the underlying storage device. Otherwise, at block 808, a determination is made, suing the page's group bit 340b, whether the page was written to Group X or Group Y at the last checkpoint. At blocks 810, 812, the page is read from the determined user block group using a user LBA. The user LBA may be calculated using the technique described above in conjunction with FIG. 6. The user page is returned from the storage device to the application.

Although the method 800 is described in terms of reading a single user page, those skilled in the art will understand that the method can be readily extended for reading multiple pages (e.g., a range of pages).

Figure 9:
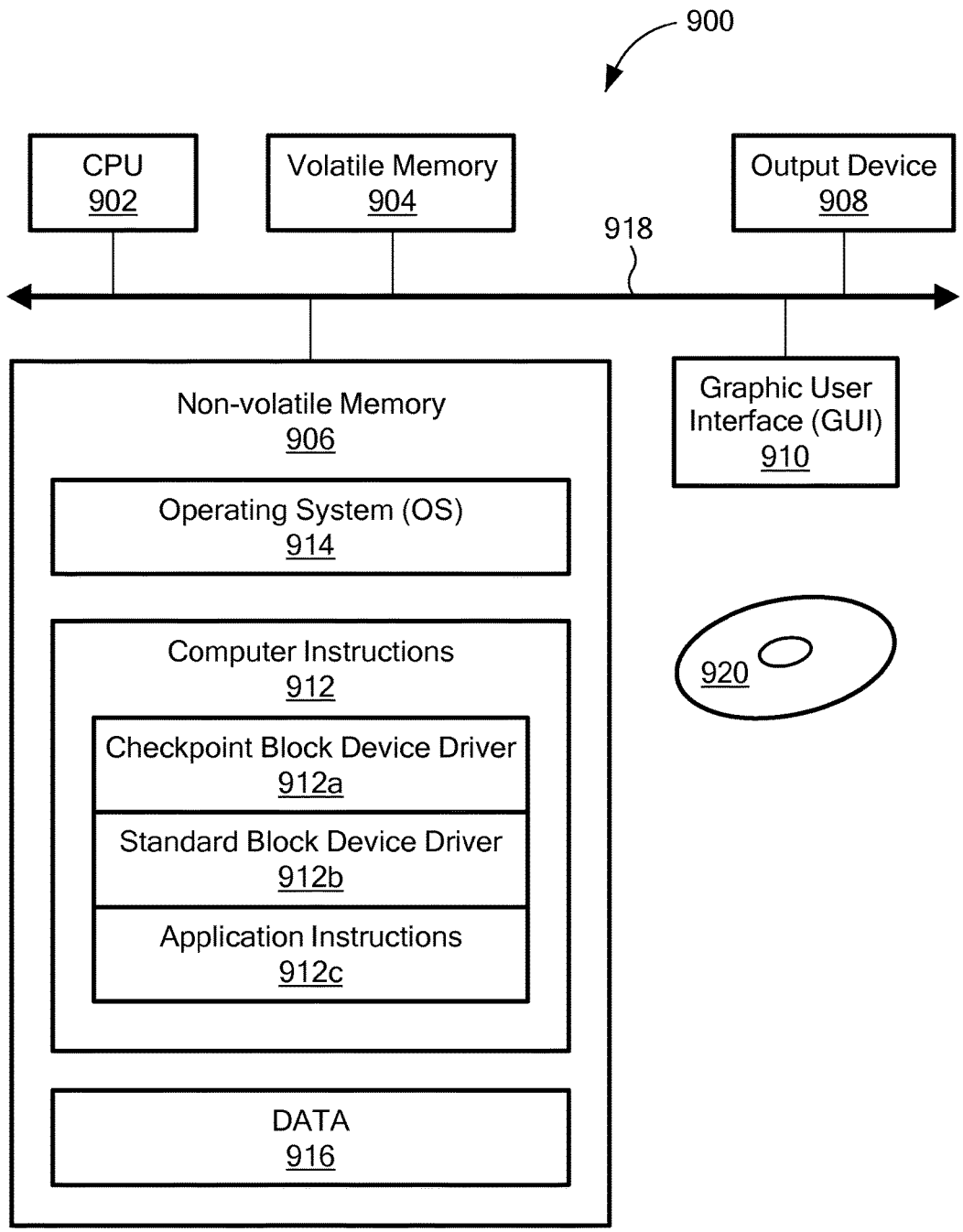
FIG. 9 is a schematic representation of a computer for use with a checkpoint device.

FIG. 9 shows an illustrative computer or other processing device 900 that can perform at least part of the processing described herein. The computer 900 includes a processor 902, a volatile memory 904, a non-volatile memory 906 (e.g., hard disk), an output device 908 and a graphical user interface (GUI) 910 (e.g., a mouse, a keyboard, a display, for example), each of which is coupled together by a bus 918. The non-volatile memory 906 stores computer instructions 912, an operating system 914, and data 916. In one example, the computer instructions 912 are executed by the processor 902 out of volatile memory 904. In a particular embodiment, the computer instructions 912 comprise instructions corresponding to a checkpoint block device driver 912a, instructions corresponding to a standard block device driver 912b, and application instructions 912c. In some embodiments, the volatile memory 904 corresponds to the host memory 202 of FIG. 2 and, therefore, may include a working header block 204', preloaded selection bitmap blocks 206', a page write bitmap 210, and/or bitmap block dirty flags 212. In one embodiment, an article 920 comprises non-transitory computer-readable instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

A non-transitory machine-readable medium may include but is not limited to a hard drive, compact disc, flash memory, non-volatile memory, volatile memory, magnetic diskette and so forth but does not include a transitory signal per se.

Having described certain embodiments, which serve to illustrate various concepts, structures, and techniques sought to be protected herein, it will be apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A method comprising:
receiving a request to write a user page to a storage device;
loading a header block from the storage device into memory, the header block indicating whether bitmap blocks were written to a first bitmap block region or a second bitmap block region at a last checkpoint, the first and second bitmap block regions located within the storage device;
loading a bitmap block from the storage device into memory, based at least in part upon information in the header block, the bitmap block indicating whether the user page was written to a first storage region or a second storage region at a last checkpoint, the first and second storage regions located within the storage device;
selecting, based at least in part upon information within the bitmap block, the first or second storage region to write the user page to;
updating a bitmap block in memory to indicate the selected storage region;
writing the user page to the selected storage region; and
in response to receiving a checkpoint request, writing the bitmap block to the storage device and atomically writing the header block to the storage device,
wherein writing the bitmap block to the storage device comprises:
selecting, based at least in part upon information within the header block, the first or second bitmap block region to write the bitmap block to;
updating the header block in memory to indicate the selected bitmap block region; and
writing the bitmap block to the selected bitmap block region.

2. The method of claim 1 wherein loading the header block from the storage device includes loading the header block from a pre-determined logical block address (LBA).

3. The method of claim 1 wherein loading the bitmap block from the storage device includes loading the bitmap block from an LBA determined using information within the header block.

4. The method of claim 1 wherein writing the user page to the selected storage region includes writing the user page to an LBA calculated using an offset within the header block, the offset associated with the selected storage region.

5. The method of claim 1 further comprising, in response to receiving the checkpoint request, calculating an error detection code based upon information within the header block and updating the header block in memory to include the calculated error detection code.

6. The method of claim 5 wherein the error detection code comprises a 32-bit cyclic redundancy code (CRC).

7. The method of claim 1 further comprising:
updating a page write bitmap in memory to indicate the user page was written since the last checkpoint, wherein selecting the first or second storage region is further based upon the page write bitmap; and
in response to receiving the checkpoint request, clearing the page write bitmap.

8. The method of claim 1 wherein the bitmap block is one of a plurality of bitmap blocks, the method further comprising:
setting one of a plurality of bitmap block dirty flags in memory to indicate the user page was written since the last checkpoint;
in response to receiving the checkpoint request, using the plurality of bitmap block dirty flags to determine which of a plurality of bitmap blocks to write to the storage device; and
in response to receiving the checkpoint request, clearing the plurality of bitmap block dirty flags.

9. The method of claim 1 further comprising:
receiving a request to read the user page from the storage device;
determining, based at least in part upon information within the bitmap block, whether the user page was written to the first or second storage region at the last checkpoint; and
reading the user page from the determined storage region.

10. The method of claim 9 wherein the bitmap block further indicates whether the user block has previously been written to, wherein the user page is not read from the determined storage region if the user page has not previously been written to.

11. A data storage system comprising:
a storage device;
a memory device;
a checkpoint device means coupled to the storage device and the memory device, the checkpoint device means for:
receiving a request to write a user page to the storage device;
loading a header block from the storage device into memory, the header block indicating whether bitmap blocks were written to a first bitmap block region or a second bitmap block region at a last checkpoint, the first and second bitmap block regions located within the storage device;
loading a bitmap block from the storage device into the memory, based at least in part upon information in the header block, the bitmap block indicating whether the user page was written to a first storage region or a second storage region at a last checkpoint, the first and second storage regions located within the storage device;
selecting, based at least in part upon information within the bitmap block, the first or second storage region to write the user page to;
updating a bitmap block in memory to indicate the selected storage region;
writing the user page to the selected storage region; and
in response to receiving a checkpoint request, writing the bitmap block to the storage device and atomically writing the header block to the storage device, wherein writing the bitmap block to the storage device comprises:
selecting, based at least in part upon information within the header block, the first or second bitmap block region to write the bitmap block to;
updating the header block in memory to indicate the selected bitmap block region; and
writing the bitmap block to the selected bitmap block region.

12. The data storage system of claim 11 wherein the checkpoint device means is associated with a device driver of an operating system (OS).

13. The data storage system of claim 11 wherein the storage device includes a Flash device.

14. The data storage system of claim 11 wherein the checkpoint device means is operatively coupled to the storage device via a storage area network (SAN).

15. The data storage system of claim 11 wherein the header block is stored within the storage device at a pre-determined logical block address (LBA).

16. The data storage system of claim 11 wherein the bitmap block is stored within a region of the storage device beginning at an LBA offset specified within the header block.

17. The data storage system of claim 11 wherein the selected storage region begins at an LBA offset specified within the header block.

18. A computer program product tangibly embodied in a non-transitory computer-readable medium, the computer-readable medium storing program instructions that are executable to:
receive a request to write a user page to a storage device;
load a header block from the storage device into memory, the header block indicating whether bitmap blocks were written to a first bitmap block region or a second bitmap block region at a last checkpoint, the first and second bitmap block regions located within the storage device;
load a bitmap block from the storage device into memory, based at least in part upon information in the header block, the bitmap block indicating whether the user page was written to a first storage region or a second storage region at a last checkpoint, the first and second storage regions located within the storage device;
select, based at least in part upon information within the bitmap block, the first or second storage region to write the user page to;
update a bitmap block in memory to indicate the selected storage region;
write the user page to the selected storage region; and
in response to receiving a checkpoint request, write the bitmap block to the storage device and atomically write the header block to the storage device, wherein writing the bitmap block to the storage device comprises:

selecting, based at least in part upon information within the header block, the first or second bitmap block region to write the bitmap block to;

updating the header block in memory to indicate the selected bitmap block region; and writing the bitmap block to the selected bitmap block region.

* * * * *